United States Patent
Ying (10) Patent No.: US 9,483,855 B2
(45) Date of Patent: Nov. 1, 2016

(54) OVERLAYING TEXT IN IMAGES FOR DISPLAY TO A USER OF A DIGITAL MAGAZINE

(71) Applicant: Flipboard, Inc., Palo Alto, CA (US)

(72) Inventor: Charles H Ying, Piedmont, CA (US)

(73) Assignee: Flipboard, Inc., Palo Alto, CA (US)

( * ) Notice: Subject to any disclaimer, the term of this patent is extended or adjusted under 35 U.S.C. 154(b) by 5 days.

(21) Appl. No.: 14/155,053

(22) Filed: Jan. 14, 2014

(65) Prior Publication Data

US 2014/0198127 A1    Jul. 17, 2014

Related U.S. Application Data

(60) Provisional application No. 61/752,951, filed on Jan. 15, 2013.

(51) Int. Cl.
*G06T 11/60* (2006.01)
*G06T 7/00* (2006.01)
(Continued)

(52) U.S. Cl.
CPC .......... *G06T 11/60* (2013.01); *G06K 9/00442* (2013.01); *G06T 7/0081* (2013.01); *G06F 17/21* (2013.01); *G06F 17/212* (2013.01); *G06F 17/217* (2013.01); *G06F 17/2229* (2013.01); *G06F 17/248* (2013.01); *G06F 17/30011* (2013.01); *G06F 17/3053* (2013.01); *G06F 17/3089* (2013.01); *G06F 17/30867* (2013.01);
(Continued)

(58) Field of Classification Search
CPC .. G06F 17/212; G06F 17/248; G06F 27/217; G06F 17/2229; G06F 17/3053; G06F 17/30867; G06F 17/21; G06F 17/218; G06F 17/24; G06F 17/30011; G06F 17/3089; G06T 11/60; G06K 2209/01
USPC ......... 382/217, 218, 283, 284; 715/246, 247
See application file for complete search history.

(56) References Cited

U.S. PATENT DOCUMENTS

| | | | |
|---|---|---|---|
| 8,826,169 B1 | 9/2014 | Yacoub et al. | |
| 2005/0080684 A1 | 4/2005 | Blum | |

(Continued)

FOREIGN PATENT DOCUMENTS

| | | |
|---|---|---|
| CN | 101127784 A | 2/2008 |
| CN | 101297315 A | 10/2008 |
| WO | WO 2010/132491 A2 | 11/2010 |

OTHER PUBLICATIONS

PCT International Search Report and Written Opinion for PCT/US2013/059297, Jan. 28, 2014, 15 Pages.

(Continued)

*Primary Examiner* — Jin-Cheng Wang
(74) *Attorney, Agent, or Firm* — Fenwick & West LLP (57) ABSTRACT

A digital magazine server presents content retrieved from various sources to a user. The content may include various images, with images selected by the digital magazine server for presentation to a user along with additional content. Text associated with an image may also be retrieved and presented to the user along with the image. To improve presentation of images with text, the digital magazine server identifies features in an image and identifies regions of the image where text is capable of being presented without obscuring or being obscured by features of the image. The image is modified to present text associated with the image in one or more of the identified images, allowing the text to be presented without detracting from features of the image.

23 Claims, 6 Drawing Sheets

(51) Int. Cl.
*G06K 9/00* (2006.01)
*G06K 9/34* (2006.01)
*G06K 9/64* (2006.01)
*G06F 17/21* (2006.01)
*G06F 17/30* (2006.01)
*G06F 17/24* (2006.01)
*G06F 17/22* (2006.01)

(52) U.S. Cl.
CPC . *G06K 2209/01* (2013.01); *G06T 2207/10024* (2013.01); *G06T 2207/20148* (2013.01)

(56) References Cited

U.S. PATENT DOCUMENTS

| | | | |
|---|---|---|---|
| 2005/0105134 | A1 | 5/2005 | Moneypenny et al. |
| 2008/0002964 | A1 | 1/2008 | Edwards |
| 2008/0082903 | A1 | 4/2008 | McCurdy et al. |
| 2008/0120670 | A1 | 5/2008 | Easton et al. |
| 2009/0049374 | A1 | 2/2009 | Echenberg |
| 2010/0262490 | A1* | 10/2010 | Ito et al. .................. 705/14.49 |
| 2011/0047368 | A1 | 2/2011 | Sundaramurthy et al. |
| 2011/0052047 | A1* | 3/2011 | Smith ........................... 382/164 |
| 2011/0222769 | A1* | 9/2011 | Galic et al. .................. 382/173 |
| 2011/0234613 | A1 | 9/2011 | Hanson et al. |
| 2011/0249903 | A1* | 10/2011 | Duga et al. .................. 382/217 |
| 2011/0302064 | A1 | 12/2011 | Dunkeld et al. |
| 2012/0066591 | A1 | 3/2012 | Hackwell |
| 2012/0124505 | A1 | 5/2012 | St. Jacques |
| 2012/0147163 | A1* | 6/2012 | Kaminsky ...................... 348/62 |
| 2012/0254188 | A1 | 10/2012 | Koperski et al. |
| 2012/0297490 | A1 | 11/2012 | Barraclough et al. |
| 2012/0304042 | A1* | 11/2012 | Pereira et al. ................ 715/201 |
| 2013/0024757 | A1* | 1/2013 | Doll et al. .................... 715/204 |
| 2013/0111334 | A1 | 5/2013 | Liang et al. |
| 2014/0075289 | A1* | 3/2014 | Brant ............................ 715/234 |
| 2014/0173397 | A1* | 6/2014 | Pereira et al. ................ 715/202 |

OTHER PUBLICATIONS

PCT International Search Report and Written Opinion for PCT/US2013/059298, Jan. 28, 2014, 15 Pages.

Office Action for Chinese Patent Application No. CN 201380053683.0, Aug. 30, 2016, 15 Pages (With Concise Explanation of Relevance).

* cited by examiner

OVERLAYING TEXT IN IMAGES FOR DISPLAY TO A USER OF A DIGITAL MAGAZINE

CROSS-REFERENCE TO RELATED APPLICATIONS

This application claims the benefit of U.S. Provisional Patent Application No. 61/752,951, filed on Jan. 15, 2013, which is incorporated by reference herein in its entirety.

BACKGROUND

This invention generally relates to presenting images in a digital magazine, and more specifically to overlaying text to images presented to a user via a digital magazine.

A digital magazine server provides digital content to its users as a digital magazine including various pages each including content items arranged in positions relative to each other. Frequently, digital content provided by the digital magazine server to its users includes images and text associated with the images. To increase the number of content items presented in a page of the digital magazine, a digital magazine server often includes text providing additional information about an image in the image itself. However, conventional methods of including text in an image often result in the text being illegible or obscuring objects in the image likely to be of interest to a user.

SUMMARY

A digital magazine server retrieves content from one or more sources and generates a personalized, customizable digital magazine for a user, based on the retrieved content. The digital magazine server organizes content items having at least one common characteristic into various sections based on page templates describing the relative positioning of content items to each other. Content items are presented to the user according to the sections.

The retrieved content items may be associated with images or include images, and the digital magazine server selects images for presentation to the user. Text associated with an image is also identified and presented as part of the image or in conjunction with the image. However, presenting text in an image may cause portions of the text to appear illegible because of objects or features of the image or may obscure portions of the image. To improve presentation of images with text to users via a digital magazine, the digital magazine server identifies features in an image and identifies regions in an image capable of presenting text that do not obscure the identified features.

The digital magazine server selects text associated with an image for presentation in one or more of the identified regions capable of presenting text. For example, an image template including regions capable of presenting text in similar locations to locations of the identified regions capable of presenting text. One or more regions in the image template capable of presenting text are selected, and the image is modified to include text associated with the image in the selected regions of the image capable of presenting text. The modified image is then stored by the digital magazine server or presented to a user in a section of the digital magazine.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Overview

A digital magazine server retrieves content from one or more sources and generates a personalized, customizable digital magazine for a user based on the retrieved content. The generated digital magazine is retrieved by a digital magazine application executing on a computing device (such as a mobile communication device, tablet, computer, or any other suitable computing system) and presented to the user. For example, based on selections made by the user and/or on behalf of the user, the digital server application generates a digital magazine including one or more sections including content items retrieved from a number of sources and personalized for the user. The generated digital magazine allows the user to more easily consume content that interests and inspires the user by presenting content items in an easily navigable interface via a computing device.

The digital magazine may be organized into a number of sections that each include content having a common characteristic (e.g., content obtained from a particular source). For example, a section of the digital magazine includes articles from an online news source (such as a website for a news organization), another section includes articles from a third-party-curated collection of content associated with a particular topic (e.g., a technology compilation), and an additional section includes content obtained from one or more accounts associated with the user and maintained by one or more social networking systems. For purposes of illustration, content included in a section is referred to herein as "content items" or "articles," which may include textual articles, pictures, videos, products for sale, user-generated content (e.g., content posted on a social networking system), advertisements, and any other types of content capable of display within the context of a digital magazine.

System Architecture

Figure 1:
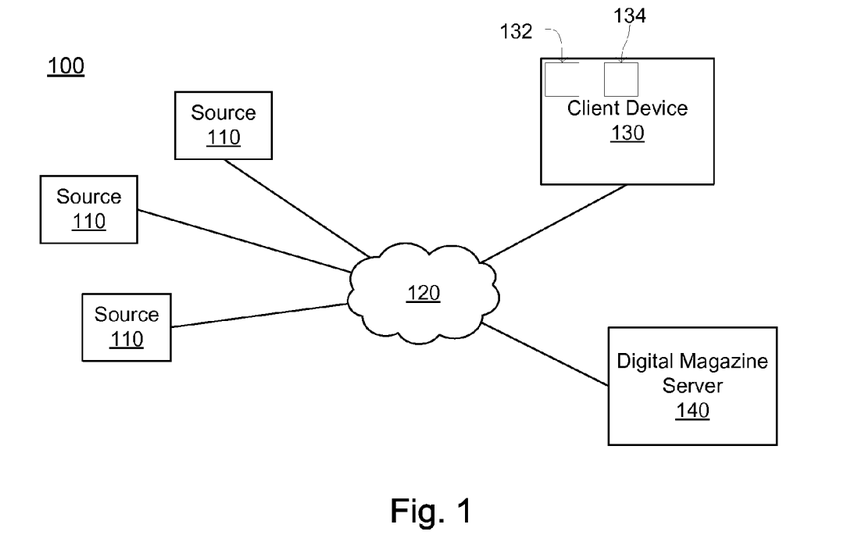
FIG. 1 is a block diagram of a system environment in which a digital magazine server operates, in accordance with an embodiment of the invention.

FIG. 1 is a block diagram of a system environment 100 for a digital magazine server 140. The system environment 100 shown by FIG. 1 comprises one or more sources 110, a network 120, a client device 130, and the digital magazine server 140. In alternative configurations, different and/or additional components may be included in the system environment 100. The embodiments described herein can be adapted to online systems that are not digital magazine severs 140.

A source 110 is a computing system capable of providing various types of content to a client device 130. Examples of content provided by a source 110 include text, images, video, or audio on web pages, web feeds, social networking information, messages, or other suitable data. Additional examples of content include user-generated content such as blogs, tweets, shared images, video or audio, social networking posts, and social networking status updates. Content provided by a source 110 may be received from a publisher (e.g., stories about news events, product information, entertainment, or educational material) and distributed by the source 110, or a source 110 may be a publisher of content it generates. For convenience, content from a source, regardless of its composition, may be referred to herein as an "article," a "content item," or as "content." A content item may include various types of content, such as text, images, and video.

The sources 110 communicate with the client device 130 and the digital magazine server 140 via the network 120, which may comprise any combination of local area and/or wide area networks, using both wired and/or wireless communication systems. In one embodiment, the network 120 uses standard communications technologies and/or protocols. For example, the network 120 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 120 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 120 may be represented using any suitable format, such as hypertext markup language (HTML) or extensible markup language (XML). In some embodiments, all or some of the communication links of the network 120 may be encrypted using any suitable technique or techniques.

The client device 130 is one or more computing devices capable of receiving user input as well as transmitting and/or receiving data via the network 120. In one embodiment, the client device 130 is a conventional computer system, such as a desktop or a laptop computer. Alternatively, the client device 130 may be a device having computer functionality, such as a personal digital assistant (PDA), a mobile telephone, a smartphone or another suitable device. In one embodiment, the client device 130 executes an application allowing a user of the client device 110 to interact with the digital magazine server 140. For example, an application executing on the client device 130 communicates instructions or requests for content items to the digital magazine server 140 to modify content presented to a user of the client device 130. As another example, the client device 130 executes a browser that receives pages from the digital magazine server 140 and presents the pages to a user of the client device 130. In another embodiment, the client device 130 interacts with the digital magazine server 140 through an application programming interface (API) running on a native operating system of the client device 110, such as IOS® or ANDROID™. While FIG. 1 shows a single client device 130, in various embodiments, any number of client devices 130 may communicate with the digital magazine server 140.

A display device 132 included in the client device 130 presents content items to a user of the client device 130. Examples of the display device 132 include a liquid crystal display (LCD), an organic light emitting diode (OLED) display, an active matrix liquid crystal display (AMLCD), or any other suitable device. Different client devices 130 may have display devices 132 with different characteristics. For example, different client devices 132 have display devices 132 with different display areas, different resolutions, or differences in other characteristics.

One or more input devices 134 included in the client device 130 receive input from the user. Different input devices 134 may be included in the client device 130. For example, the client device 130 includes a touch-sensitive display for receiving input data, commands, or information from a user. Using a touch-sensitive display allows the client device 130 to combine the display device 132 and an input device 134, simplifying user interaction with presented content items. In other embodiments, the client device 130 may include a keyboard, a trackpad, a mouse, or any other device capable of receiving input from a user. In another example, the input device 134 is configured to receive information from a user of the client device through a touchless interface. Examples of a touchless interface include sensors, such as an image capture device, to receive gestures from a client device user without the user physically contacting the display device 132 or the client device 130. Additionally, the client device may include multiple input devices 134 in some embodiments. Inputs received via the input device 134 may be processed by a digital magazine application associated with the digital magazine server 140 and executing on the client device 130 to allow a client device user to interact with content items presented by the digital magazine server 140.

The digital magazine server 140 receives content items from one or more sources 110, generates pages in a digital magazine by processing the received content, and provides the pages to the client device 130. As further described below in conjunction with FIG. 2, the digital magazine server 140 generates one or more pages for presentation to a user based on content items obtained from one or more sources 110 and information describing organization and presentation of content items. For example, the digital magazine server 140 determines a page layout specifying positioning of content items relative to each other based on information associated with a user and generates a page including the content items arranged according to the determined layout for presentation to the user via the client device 130. This allows the user to access content items via the client device 130 in a format that enhances the user's interaction with and consumption of the content items. For example, the digital magazine server 140 provides a user with content items in a format similar to the format used by print magazines. By presenting content items in a format similar to a print magazine, the digital magazine server 140 allows a user to interact with content items from multiple sources 110 via the client device 130 with less inconvenience from horizontally or vertically scrolling to access various content items.

Figure 2:
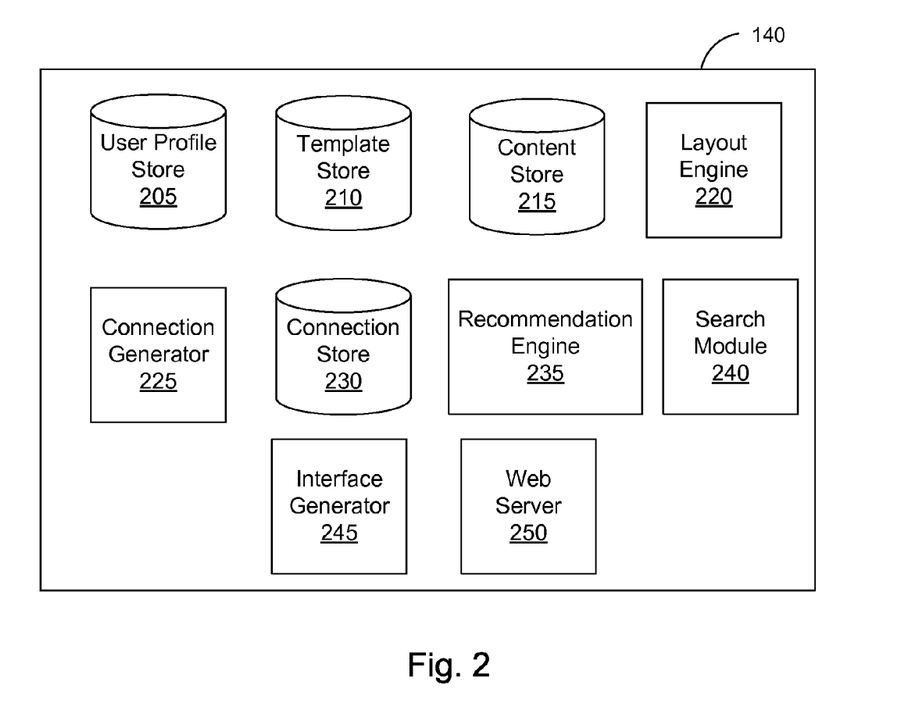
FIG. 2 is a block diagram of a digital magazine server, in accordance with an embodiment of the invention.

FIG. 2 is a block diagram of an architecture of the digital magazine server 140. The digital magazine server 140 shown in FIG. 2 includes a user profile store 205, a template store 210, a content store 215, a layout engine 220, a connection generator 225, a connection store 230, a recommendation engine 235, a search module 240, an interface generator 245, and a web server 250. In other embodiments, the digital magazine server 140 may include additional, fewer, or different components for various applications. Conventional components such as network interfaces, security functions, load balancers, failover servers, management and network operations consoles, and the like are not shown so as to not obscure the details of the system architecture.

Each user of the digital magazine server 140 is associated with a user profile, which is stored in the user profile store 205. A user profile includes declarative information about the user that was explicitly shared by the user and may also include profile information inferred by the digital magazine server 140. In one embodiment, a user profile includes multiple data fields, each describing one or more attributes of the corresponding social networking system user. Examples of information stored in a user profile include biographic, demographic, and other types of descriptive information, such as gender, hobbies or preferences, location, or other suitable information. A user profile in the user profile store 205 also includes data describing interactions by a corresponding user with content items presented by the digital magazine server 140. For example, a user profile includes a content item identifier, a description of an interaction with the content item corresponding to the content item identifier, and a time when the interaction occurred.

While user profiles in the user profile store 205 are frequently associated with individuals, allowing individuals to provide and receive content items via the digital magazine server 140, user profiles may also be stored for entities such as businesses or organizations. This allows an entity to provide or access content items via the digital magazine server 140. An entity may post information about itself, about its products or provide other content items associated with the entity to users of the digital magazine server 140. For example, users of the digital magazine server 140 may receive a digital magazine or section including content items associated with an entity via the digital magazine server 140.

The template store 210 includes page templates each describing a spatial arrangement ("layout") of content items relative to each other on a page for presentation by a client device 130. A page template includes one or more slots, each configured to present one or more content items. In some embodiments, slots in a page template may be configured to present a particular type of content item or to present a content item having one or more specified characteristics. For example, a slot in a page template is configured to present an image while another slot in the page template is configured to present text data. Each slot has a size (e.g., small, medium, or large) and an aspect ratio. One or more page templates may be associated with types of client devices 130, allowing content items to be presented in different relative locations and with different sizes when the content items are viewed using different client devices 130. Additionally, page templates may be associated with sources 110, allowing a source 110 to specify the format of pages presenting content items received from the source 110. For example, an online retailer is associated with a page template to allow the online retailer to present content items via the digital magazine server 140 with a specific organization. Examples of page templates are further described in U.S. patent application Ser. No. 13/187,840, filed on Jul. 21, 2011, which is hereby incorporated by reference in its entirety.

The content store 215 stores objects that each represent various types of content. For example, the content store 215 stores content items received from one or more sources 115 within a threshold time of a current time. Examples of content items stored by the content store 215 include a page post, a status update, a photograph, a video, a link, an article, video data, audio data, a check-in event at a location, or any other type of content. A user may specify a section including content items having a common characteristic, and the common characteristic is stored in the content 215 store along with an association with the user profile or the user specifying the section.

The layout engine 220 retrieves content items from one or more sources 110 or from the content store 215 and generates a page including the content items based on a page template from the template store 210. Based on the retrieved content items, the layout engine 220 may identify candidate page templates from the template store 210, score the candidate page templates based on characteristics of the slots in different candidate page templates and based on characteristics of the content items. Based on the scores associated with candidate page templates, the layout engine 220 selects a page template and associates the retrieved content items with one or more slots to generate a page where the retrieved content items are presented relative to each other and sized based on their associated slots. When associating a content item with a slot, the layout engine 220 may associate the content item with a slot configured to present a specific type of content item or to present content items having one or more specified characteristics. An example of using a page template to present content items is further described in U.S. patent application Ser. No. 13/187, 840, filed on Jul. 21, 2011, which is hereby incorporated by reference in its entirety.

In some embodiments, the layout engine 220 modifies an image retrieved from the content store 215 or from one or more sources 110 to improve presentation of text in conjunction with the image. For example, the layout engine 220 modifies the retrieved image to include text associated with the image. As further described below in conjunction with FIG. 4, the layout engine 220 identifies features of the image and identifies regions of the image capable of presenting text. A region of the image capable of presenting text is a region that is at least a threshold distance from one or more features of the image, so the text does not obscure a feature of the image. The image is modified to include text in one or more of the regions capable of presenting text, and the modified image is presented to a user of the digital magazine server 140, allowing additional information to be presented along with the image while increasing the amount of display area available to display additional content items.

The connection generator 225 monitors interactions between users and content items presented by the digital magazine server 140. Based on the interactions, the connection generator 225 determines connections between various content items, connections between users and content items, or connections between users of the digital magazine server 140. For example, the connection generator 225 identifies when users of the digital magazine server 140 provide feedback about a content item, access a content item, share a content item with other users, or perform other actions with content items. In some embodiments, the connection generator 225 retrieves data describing user interaction with content items from the user's user profile in the user profile store 205. Alternatively, user interactions with content items are communicated to the connection generator 225 when the interactions are received by the digital magazine server 140. The connection generator 225 may account for temporal information associated with user interactions with content items. For example, the connection generator 225 identifies user interactions with a content item within a specified time interval or applies a decay factor to identified user interactions based on times associated with interactions. The connection generator 225 generates a connection between a user and a content item if the user's interactions with the content item satisfy one or more criteria. In one embodiment, the connection generator 225 determines one or more weights specifying a strength of the connection between the user and the content item based on user interactions with the content item that satisfy one or more criteria. Generation of connections between a user and a content item is further described in U.S. patent application Ser. No. 13/905,016, filed on May 29, 2013, which is hereby incorporated by reference in its entirety.

If multiple content items are connected to a user, the connection generator 225 establishes implicit connections between each of the content items connected to the user. In one embodiment, the connection generator 225 maintains a user content graph identifying the implicit connections between content items connected to a user. In one embodiment, weights associated with connections between a user and content items are used to determine weights associated with various implicit connections between content items. User content graphs for multiple users of the digital magazine server 140 are combined to generate a global content graph describing connections between various content items provided by the digital magazine server 140 based on user interactions with various content items. For example, the global content graph is generated by combining user content graphs based on mutual connections between various content items in user content graphs.

In one embodiment, the connection generator 225 generates an adjacency matrix from the global content graph or from multiple user content graphs and stores the adjacency matrix in the connection store 230. The adjacency matrix describes connections between content items. For example, the adjacency matrix includes identifiers of content items and weights representing the strength or closeness of connections between content items based on the global content graph. As an example, the weights indicate a degree of similarity in subject matter or similarity of other characteristics associated with various content items. In other embodiments, the connection store 230 includes various adjacency matrices determined from various user content graphs; the adjacency matrices may be analyzed to generate an overall adjacency matrix for content items provided by the digital magazine server 140. Graph analysis techniques may be applied to the adjacency matrix to rank content items, to recommend content items to a user, or to otherwise analyze relationships between content items. An example of the adjacency matrix is further described in U.S. patent application Ser. No. 13/905,016, filed on May 29, 2013, which is hereby incorporated by reference in its entirety.

In addition to identifying connections between content items, the connection generator 225 may also determine a social proximity between users of the digital magazine server 140 based on interactions between users and content items. The digital magazine server 140 determines social proximity, or "social distance," between users using a variety of techniques. For example, the digital magazine server 140 analyzes additional users connected to each of two users of the digital magazine server 140 within a social networking system to determine the social proximity of the two users. In another example, the digital magazine server 140 determines social proximity between a first and a second user by analyzing the first user's interactions with content items posted by the second user, whether the content item is posted using the digital magazine server 140 or on another social networking system. Additional examples for determining social proximity between users of the digital magazine server 140 are described in U.S. patent application Ser. No. 13/905,016, filed on May 29, 2013, which is incorporated by reference in its entirety. In one embodiment, the connection generator 225 determines a connection confidence value between a user and an additional user of the digital magazine server 140 based on the user's and the additional user's common interactions with particular content items. The connection confidence value may be a numerical score representing a measure of closeness between the user and the additional user. For example, a larger connection confidence value indicates a greater similarity between the user and the additional user. In one embodiment, if a user has at least a threshold connection confidence value with another user, the digital magazine server 140 stores a connection between the user and the additional user in the connection store 230.

Using data from the connection store 230, the recommendation engine 235 identifies content items from one or more sources 110 for recommending to a digital magazine server user. Hence, the recommendation engine 235 identifies content items potentially relevant to a user. In one embodiment, the recommendation engine 235 retrieves data describing interactions between a user and content items from the user's user profile and data describing connections between content items, and/or connections between users from the connection store 230. In one embodiment, the recommendation engine 235 uses stored information describing content items (e.g., topic, sections, subsections) and interactions between users and various content items (e.g., views, shares, saved, links, topics read, or recent activities) to identify content items that may be relevant to a digital magazine server user. For example, content items having an implicit connection of at least a threshold weight to a content item with which the user interacted are recommended to the user. As another example, a the recommendation engine 235 presents a user with content items having one or more attributes in common with a content item with which an additional user having a threshold connection confidence score with the user interacted. Recommendations for additional content items may be presented to a user when the user views a content item using the digital magazine, may be presented as a notification to the user by the digital magazine server 140, or may be presented to the user through any suitable communication channel.

In one embodiment, the recommendation engine 235 applies various filters to content items received from one or more sources 110 or from the content store 215 to efficiently provide a user with recommended content items. For example, the recommendation engine 235 analyzes attributes of content items in view of characteristics of a user retrieved from the user's user profile. Examples of attributes of content items include a type (e.g., image, story, link, video, audio, etc.), a source 110 from which a content item was received, time when a content item was retrieved, and subject matter of a content item. Examples of characteristics of a user include biographic information about the user, users connected to the user, and interactions between the user and content items. In one embodiment, the recommendation engine 235 analyzes attributes of content items in view of a user's characteristics for a specified time period to generate a set of recommended content items. The set of recommended content items may be presented to the user or may be further analyzed based on user characteristics and on content item attributes to generate more refined set of recommended content items. A setting included in a user's user profile may specify a length of time that content items are analyzed before identifying recommended content items to the user, allowing a user to balance refinement of recommended content items with time used to identify recommended content items.

The search module 240 receives a search query from a user and retrieves content items from one or more sources 110 based on the search query. For example, content items having at least a portion of an attribute matching at least a portion search query are retrieved from one or more sources 110. The user may specify sources 110 from which content items are received through settings maintained by the user's user profile or by identifying one or more sources in the search query. In one embodiment, the search module 240 generates a section of the digital magazine including the content items identified based on the search query, as the identified content items have a common attribute of their association with the search query. Presenting identified content items identified from a search query allows a user to more easily identify additional content items at least partially matching the search query when additional content items are provided by sources 110.

To more efficiently identify content items based on search queries, the search module 110 may index content items, groups (or sections) of content items, and user profile information. In one embodiment, the index includes information about various content items, such as author, source, topic, creation data/time, user interaction information, document title, or other information capable of uniquely identifying the content item. Search queries are compared to information maintained in the index to identify content items for presentation to a user. The search module 140 may present identified content items based on a ranking. One or more factors associated with the content items may be used to generate the ranking. Examples of factors include: global popularity of a content item among users of the digital magazine server 140, connections between users interacting with a content item and the user providing the search query, and information from a source 110. Additionally, the search module 240 may assign a weight to the index information associated with each content item selected based on similarity between the index information and a search query and rank the content items based on their weights. For example, content items identified based on a search query are presented in a section of the digital magazine in an order based in part on the ranking of the content items.

To increase user interaction with the digital magazine, the interface generator 245 maintains instructions associating received input with actions performed by the digital magazine server 140 or by a digital magazine application executing on a client device 130. For example, instructions maintained by the interface generator 245 associate types of inputs or specific inputs received via an input device 132 of a client device 130 with modifications to content presented by a digital magazine. As an example, if the input device 132 is a touch-sensitive display, the interface generator 245 includes instructions associating different gestures with navigation through content items or presented via a digital magazine. Instructions from the interface generator 245 are communicated to a digital magazine application or other application executing on a client device 130 on which content from the digital magazine server 140 is presented. Inputs received via an input device 132 of the client device 130 are processed based on the instructions when content items are presented via the digital magazine server 140 is presented to simplify user interaction with content presented by the digital magazine server 140.

The web server 250 links the digital magazine server 140 via the network 120 to the one or more client devices 130, as well as to the one or more sources 110. The web server 250 serves web pages, as well as other content, such as JAVA®, FLASH®, XML and so forth. The web server 250 may retrieve content item from one or more sources 110. Additionally, the web server 250 communicates instructions for generating pages of content items from the layout engine 220 and instructions for processing received input from the interface generator 245 to a client device 130 for presentation to a user. The web server 250 also receives requests for content or other information from a client device 130 and communicates the request or information to components of the digital magazine server 140 to perform corresponding actions. Additionally, the web server 250 may provide application programming interface (API) functionality to send data directly to native client device operating systems, such as IOS®, ANDROID™, WEBOS®, or BlackberryOS.

For purposes of illustration, FIG. 2 describes various functionalities provided by the digital magazine server 140. However, in other embodiments, the above-described functionality may be provided by a digital magazine application executing on a client device 130, or may be provided by a combination of the digital magazine server 140 and a digital magazine application executing on a client device 130. For example, images may be over laid with text to generate modified images and presented by a digital magazine application executing on the client device 130. Alternatively, information identifying slots of a page template used to generate a page of a digital magazine are communicated from a client device 130 to the digital magazine server 140, which identifies one or more images for presentation in content regions of a page; the modified images are communicated from the digital magazine server 140 to the client device 130 for presentation.

Page Templates

Figure 3:
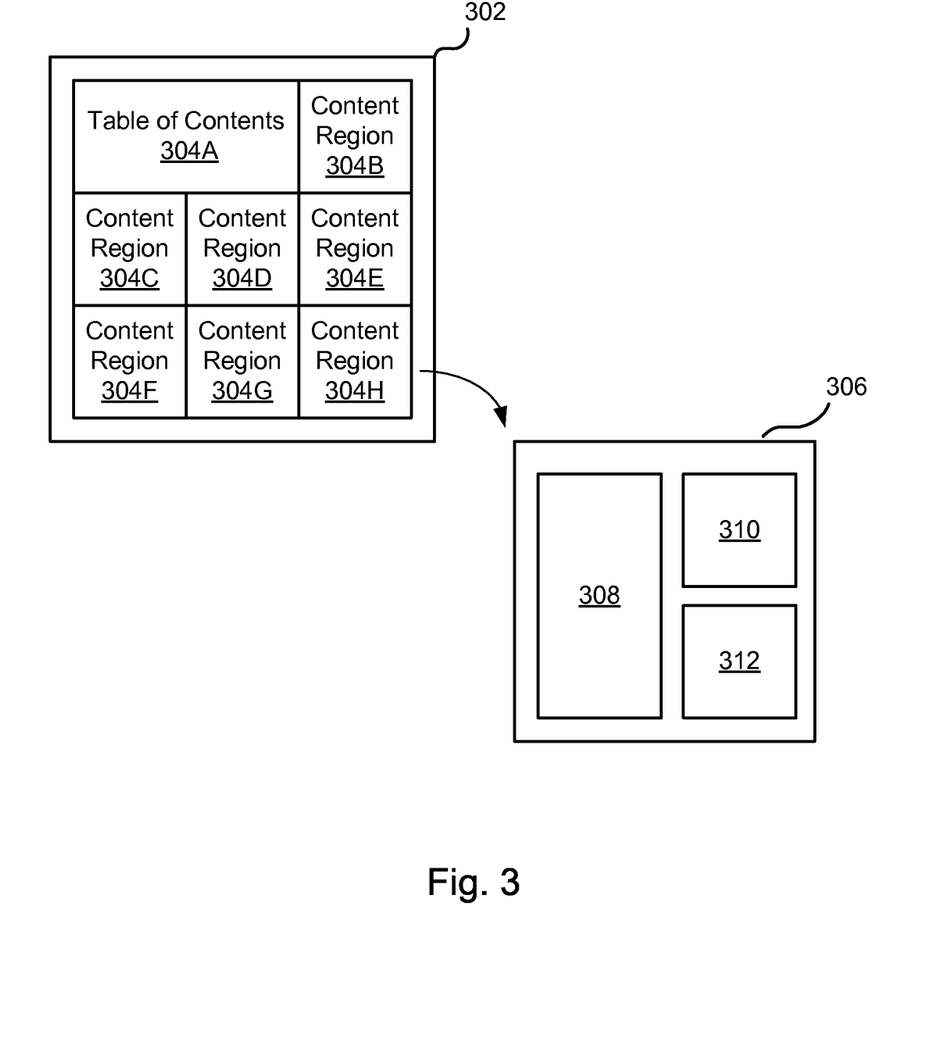
FIG. 3 is an example of presentation of content items in a digital magazine using a page template, in accordance with an embodiment of the invention.

FIG. 3 illustrates an example page template 302 having multiple rectangular slots each configured to present a content item. Other page templates with different configurations of slots may be used by the digital magazine server 140 to present one or more content items received from sources 110. As described above in conjunction with FIG. 2, in some embodiments, one or more slots in a page template are reserved for presentation of content items having specific characteristics or for presentation of a specific type of content item. In one embodiment, the size of a slot may be specified as a fixed aspect ratio or using fixed dimensions. Alternatively, the size of a slot may be flexible, where the aspect ratio or one or more dimensions of a slot is specified as a range, such as a percentage of a reference or a base dimension. Arrangement of slots within a page template may also be hierarchical. For example, a page template is organized hierarchically, where an arrangement of slots may be specified for the entire page template or for one or more portions of the page template.

In the example of FIG. 3, when a digital magazine server 140 generates a page for presentation to a user, the digital magazine server 140 populates slots in a page template 302 with content items. Information identifying the page template 302 and associations between content items and slots in the page template 302 is stored and used to generate the page. For example, to present a page to a user, the layout engine 220 identifies the page template 102 from the template store 210 and retrieves content items from one or more sources 110 or from the content store 215. The layout engine 220 generates data or instructions associating content items with slots within the page template 302. Hence, the generated page includes various "content regions" presenting one or more content items associated with a slot in a location specified by the slot.

A content region 304 may present image data, text, data, a combination of image and text data, or any other information retrieved from a corresponding content item. For example, in FIG. 3, the content region 304A represents a table of contents identifying sections of a digital magazine, and content associated with the various sections are presented in content regions 304B-304H. For example, content region 304A includes text or other data indicating that the presented data is a table of contents, such the text "Cover Stories Featuring," followed by one or more identifiers associated with various sections of the digital magazine. In one embodiment, an identifier associated with a section describes a characteristic common to at least a threshold number of content items in the section. For example, an identifier refers to the name of a user of social network from which content items included in the section are received. As another example, an identifier associated with a section specifies a topic, an author, a publisher (e.g., a newspaper, a magazine) or other characteristic associated with at least a threshold number of content items in the section. Additionally, an identifier associated with a section may further specify content items selected by a user of the digital magazine server 140 and organized as a section. Content items included in a section may be related topically and include text and/or images related to the topic.

Sections may be further organized into subsections, with content items associated with one or more subsections presented in content regions. Information describing sections or subsections, such as a characteristic common to content items in a section or subsection, may be stored in the content store 215 and associated with a user profile to simplify generation of a section or subsection for the user. A page template associated with a subsection may be identified, and slots in the page template associated with the subsection used to determine presentation of content items from the subsection relative to each other. Referring to FIG. 3, the content region 304H includes a content item associated with a newspaper to indicate a section including content items retrieved from the newspaper. When a user interacts with the content region 304, a page template associated with the section is retrieved, as well as content items associated with the section. Based on the page template associated with the section and the content items, the digital magazine server 140 generates a page presenting the content items based on the layout described by the slots of the page template. For example, in FIG. 3, the section page 306 includes content regions 308, 310, 312 presenting content items associated with the section. The content regions 308, 310, 312 may include content items associated with various subsections including content items having one or more common characteristics (e.g., topics, authors, etc.). Hence, a subsection may include one or more subsections, allowing hierarchical organization and presentation of content items by a digital magazine.

Overlaying Text in Images for Presentation

Figure 4:
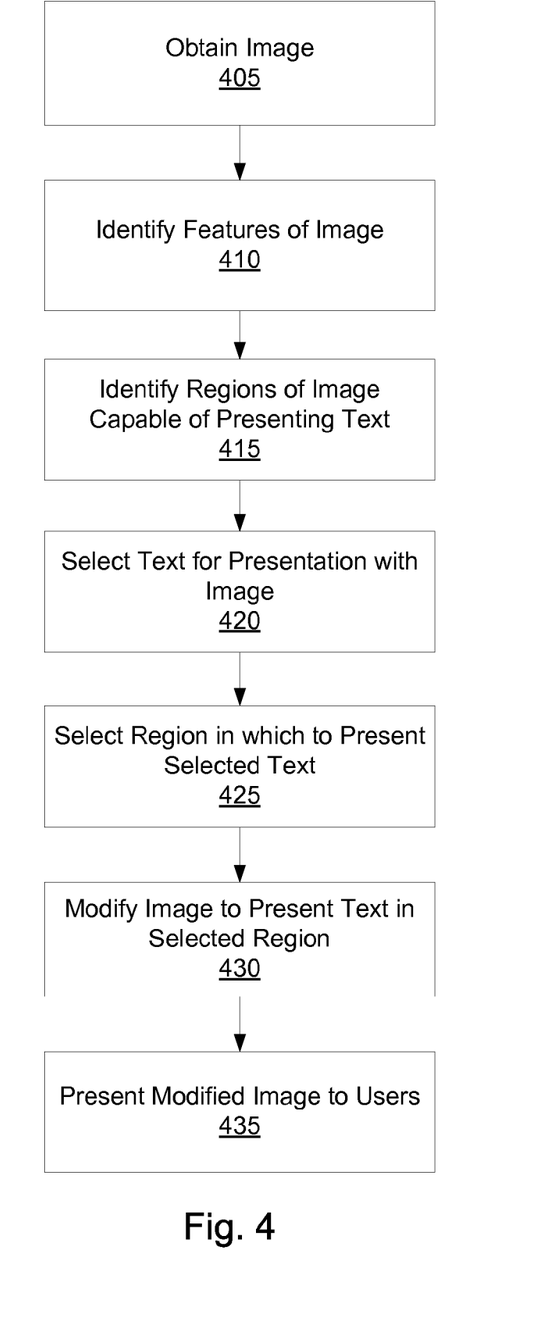
FIG. 4 shows a flow chart of a method for overlaying text in an image for display to a user of a digital magazine, in accordance with an embodiment of the invention.

FIG. 4 shows a flowchart of one embodiment of a method for overlaying text in an image for display to a user of a digital magazine server 140. In one embodiment, the functionality described in conjunction with FIG. 4 is performed by the layout engine 220; however, in other embodiments, any suitable component or combination of components may perform the functionality described in conjunction with FIG. 4. Additionally, in some embodiments, different and/or additional steps than those identified in FIG. 4 may be performed or the steps identified in FIG. 4 may be performed in different orders.

The digital magazine server 140, or an application associated with the digital magazine server 140 and executing on a client device 110, obtains 405 images from one or more sources 110 or the from content store 215 for presentation to a user of the digital magazine server 140 in a digital magazine. For example, an image is obtained 404 from a source 110 for display with content associated with the source 110. Alternatively, an image is obtained 405 from the content store 215 for presentation with textual data retrieved from the content store 215.

The digital magazine server 140 identifies 410 features of the obtained image. A feature of an image is an object presented by the image or a region of the image including an object. In one embodiment, the digital magazine server 140 identifies 410 features of the image by identifying edges of objects in the image; however, various image processing methods may be used to identify 410 features of the obtained image. For example, various edge detection techniques or object recognition algorithms may be used to identify 410 objects. Additional characteristics of the image may also be analyzed, such as abrupt changes in background color of the image, to identify 410 objects in the image. Alternatively, features of the image are identified 410 by manually review of the image. In another example, the source 110 from which the image is obtained 405 provides information identifying 410 features in the image along with the image.

Additionally, the digital magazine server 140 may identify additional information associated with identified features of the image. Examples of additional information include the location or position of the identified 410 feature with respect to one or more boundaries of the image, a distance between two or more identified 410 features, an identifier associated with a feature identified 410 from the image, and display attributes such as color, shape or size of an identified feature. For example, the digital magazine server 140 identifies 410 two objects of an image and information describing the objects (e.g., the size of the objects, the dimensions of the objects and the location of the objects with respect to the top left corner of the image). In one embodiment, the digital magazine server 140 identifies a group of pixels associated with an object and stores pixel indices of pixels in the group to identify a location in the image including the object.

Based at least in part on the identified features in the obtained image, the digital magazine server 140 identifies 415 regions within the image capable of presenting text. A region capable of presenting text is a location of the image that does not display objects. Typically, regions of an image that do not include objects or other features that would obscure text presented in the region. For example, regions of an image including a feature making text included in the region illegible or not contiguous are not regions within the image capable of presenting text. In one embodiment, the digital magazine server 140 identifies regions of the image a threshold distance away from one or more identified features in the image as regions capable of presenting text. In another example, the digital magazine server 140 identifies 415 regions of the image that are at least a threshold distance away from features in an image and have at least a threshold size as regions capable of presenting text. The digital magazine server 140 may identify and group pixels in a region of an image at least a threshold distance away from one or more identified features of the image and identifies 415 groups of pixels as regions of the image capable of presenting text based at least in part on sizes of pixel groups.

The digital magazine server 140 may also identify additional information associated with the identified regions of the image. Examples of additional information associated with an identified region include a location or position of the identified region with respect to one or more boundaries of the image, a distance between two or more identified regions, an identifier associated with an identified region, and display attributes of the identified region (e.g., shape, color, or size of the identified region). For example, the digital magazine server 140 identifies 415 a region in an image capable of presenting text and also identifies the size of the region, the dimensions of the region, the location of the region with respect to the top left corner of the image, and an identifier associated with the identified region. In one embodiment, the digital magazine server 140 identifies a color associated with an identified region capable of presenting text. For example, the digital magazine server 140 identifies a color associated with an identified region by determining the average color of pixels in the identified region. The additional information may be stored along with the identifier and an association between the identifier and the image.

The digital magazine server 140 selects 420 text associated with the image for presentation in conjunction with the image. The text provides information associated with the image or information associated with the content associated with the image. For example, if the image is included in a content item, the selected text is a caption describing the image that also appears in the content item. In another example, the selected text is a heading and a summary describing the content item associated with the image or including the image. In one embodiment, the selected text is provided or identified by the source 110 from which the image is received. Alternatively, the text associated with an image is manually selected 420 or is selected 420 by analyzing content associated with the image and extracting one or more key word or phrases.

The selected text associated with the image may have a variety of attributes. For example, the text has one or more display attributes such as color, preferred size of the text for display or limits on text size for display, a size of a region capable of presenting text within which to display the text, a range of sizes of regions capable of presenting text within which to display the text, or a preferred font for presenting the text. In one example, one or more colors are associated with various portions of the selected text. As another example, the text has one or more contextual attributes such as information indicating whether the text is a heading, title, caption or footnote or information describing a recommended position or location of the text within the image. Different portions of the selected text may have different attributes, allowing different portions of the text to be displayed differently. For example, the selected text includes a portion identified as a heading by a contextual attribute and an additional portion identified as a caption by a contextual attribute.

One or more regions of the image capable of presenting text are selected 425 by the digital magazine server 140 as regions in which to present the selected text. In one example, the digital magazine server 140 retrieves image templates from the template store 210 having sizes similar to the obtained image. Each of the retrieved image templates includes regions for presenting text in various locations of the image template. The regions for presenting text in an image template may have varying sizes and different positions relative to each other in various image templates. In one embodiment, the regions for presenting text identified by an image template are associated with additional information such as a location of the regions in the image template relative to a corner or boundary of the image templates or a description of the size and/or shape of the regions in the image template. As the retrieved image templates have similar dimensions (e.g., dimensions within a threshold amount of dimensions of the obtained image) to the obtained image, additional information associated with regions for presenting text in an image template provide information for associating regions for presenting text with regions capable of presenting text identified 415 from the obtained image. For example, location or positional information identifying the location of a region for presenting text in an image template is compared to location or positional information associated with regions of the obtained image capable of presenting text.

Based on the identified regions capable of presenting text in the obtained image, the digital magazine server 140 identifies image templates including regions for presenting text that have at least a threshold number of attributes matching or similar to attributes of the identified regions capable of presenting text. For example, an image template including at least a threshold number of regions for presenting text that are within a threshold distance of regions capable of presenting text identified 415 from the obtained image. The digital magazine server 140 may compare various attributes of regions capable of presenting text in the obtained image to regions for presenting text from an image template (e.g., dimensions, shape, location, etc.) to determine if the image template has regions for presenting text matching or similar to regions capable of presenting text from the obtained image. As an example, the digital magazine server 140 identifies 415 two regions of an image that are capable of presenting text, with a region rectangular in shape, traversing the width of the image, and located near an uppermost boundary of the image and another region triangular in shape and located near a lower right corner of the image. The digital magazine server 140 identifies an image template including regions for presenting text having a similar size, shape and location to the identified regions capable of presenting text in the image. After identifying an image template, the digital magazine server 140 selects 425 regions within the image template for presenting text in which to present the selected text. For example, the digital magazine server 140 selects 425 regions in the image template having a maximum degree of similarity to the identified regions. Alternatively, regions in the identified image are selected 425 based on the selected text or based on information associated with the selected text.

Alternatively, one or more of the identified regions are selected 425 to present the selected text independent of the image templates. For example, the digital magazine server 140 selects 425 an identified region capable of presenting text to present the selected text based at least in part on the attributes associated with the selected text. For example, a portion of the selected text is identified as a heading while another portion of the selected text is identified as a caption. The digital magazine server 140 selects 425 two identified regions to present the portions of the selected text based at least in part on the type of text associated with each portion; in other embodiments, additional attributes of portions of the text are used to select 425 regions of the image capable of presenting text in which the selected text is presented. For example, a region capable of presenting text in the image is located within a threshold distance of an upper boundary of an image and an additional region capable of presenting text in the image is located within a threshold distance of a lower right corner of the image. Based at least in part on the location information associated with the two identified regions capable of presenting text and the attributes of different portions of the selected text, the portion of the text identified as a heading is presented in the region capable of presenting text in the image within the threshold distance of the upper boundary and the portion of the text identified as a caption is presented in the region of the image capable of presenting text located within the threshold distance of the lower right corner of the image.

In one embodiment, the digital magazine server 140 identifies portions of the selected text for presentation in a selected region of the image capable of presenting text based at least in part on the attributes associated with the selected region. For example, the digital magazine server 140 identifies portions of the selected text for presentation in different selected regions capable of presenting text based on the size and location of the selected regions. In one embodiment, the digital magazine server 140 selects 425 two regions capable of presenting text within an image, with one region positioned near an upper boundary of the image and having a center aligned with a center of the width of the image and an additional region located within a threshold distance of the lower right corner of the image. The digital magazine server 140 may identify portions of the selected text for presentation in the region position near the upper boundary as text identified as a heading by associated contextual attributes. In one embodiment, the digital magazine server 140 stores information associating selected text with a region capable of presenting text in which the selected text is presented.

The digital magazine server 140 may identify portions of the selected text for presentation in a selected region of the image capable of presenting text based at least in part on a color associated with the selected region and a color associated with portions of the selected text. For example, the digital magazine server 140 identifies portions of the selected text for presentation in a selected region based at least in part a difference between a color associated with the selected region and a color associated with the selected text. In another example, a color contrast value is determined between colors associated with various portions of the selected text and the selected region. A portion of the selected text having a color contrast value greater than a threshold value is identified by the digital magazine server 140 for presentation in the selected region.

In one embodiment, the digital magazine server 140 modifies 430 the image to present text in the selected regions to the user of the digital magazine server. Based at least in part on the selected regions of the image capable of presenting text, the digital magazine server 140 overlays the selected text over the selected regions of the image capable of presenting text. Based on information associated with a selected region capable of presenting text, the digital magazine server 140 identifies the location or position of the selected region in the image and retrieves a portion of the selected text associated with the selected region. In one example, the selected text associated with the selected region is identified based on an identifier associating the selected text or a portion of the selected text with the selected region.

In one embodiment, the selected text associated with the selected region is modified based on attributes associated with the selected region and attributes associated with the selected text. In one embodiment, a color, a font or other attributes used to present the selected text in a selected region are modified based on the color, the size, or other attributes of the selected region. In one example, the selected text is bounded by an outline that is based at least in part on the color of the selected text or the color of the selected region. In another example, the color gradient of the selected text is modified based on the color of the selected text or the color of the selected region. As another example, the display attributes associated with the selected region are modified based on the color of the selected text associated with the selected region. For example, the color or gradient of the selected region is modified based on the color of the selected text. In another example, the selected region is modified to present to the user a vignette surrounding the selected text. The portion of the selected text associated with the selected region is overlaid on the image in a location corresponding to the selected region. In one embodiment, the modified image is stored in the content store 215.

The modified image is then presented to the user. For example, the modified image is presented along with other content items in locations relative to each other based on slots in a page template. In one embodiment, a page template is selected and a slot in the page template is identified for presenting the modified image. The modified image is retrieved and presented to the user in a location and a size determined from the identified slot.

Figure 5A:
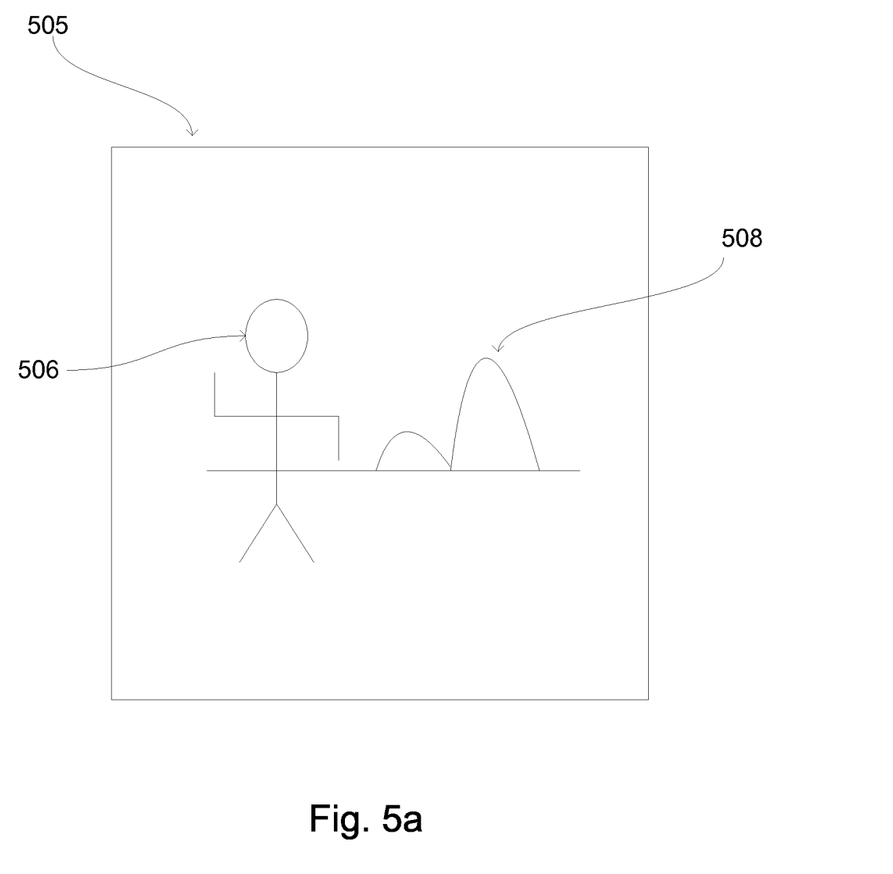
FIGS. 5A-5C are an example of overlying text in an image, in accordance with an embodiment of the invention.
Figure 5B:
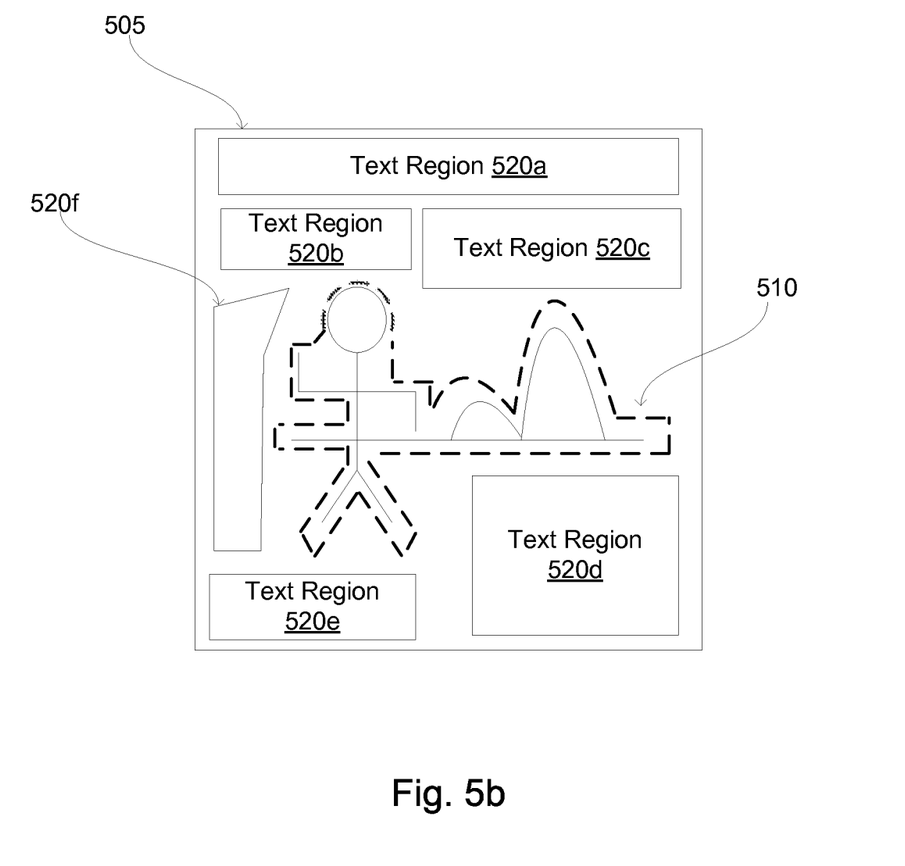
Figure 5C:
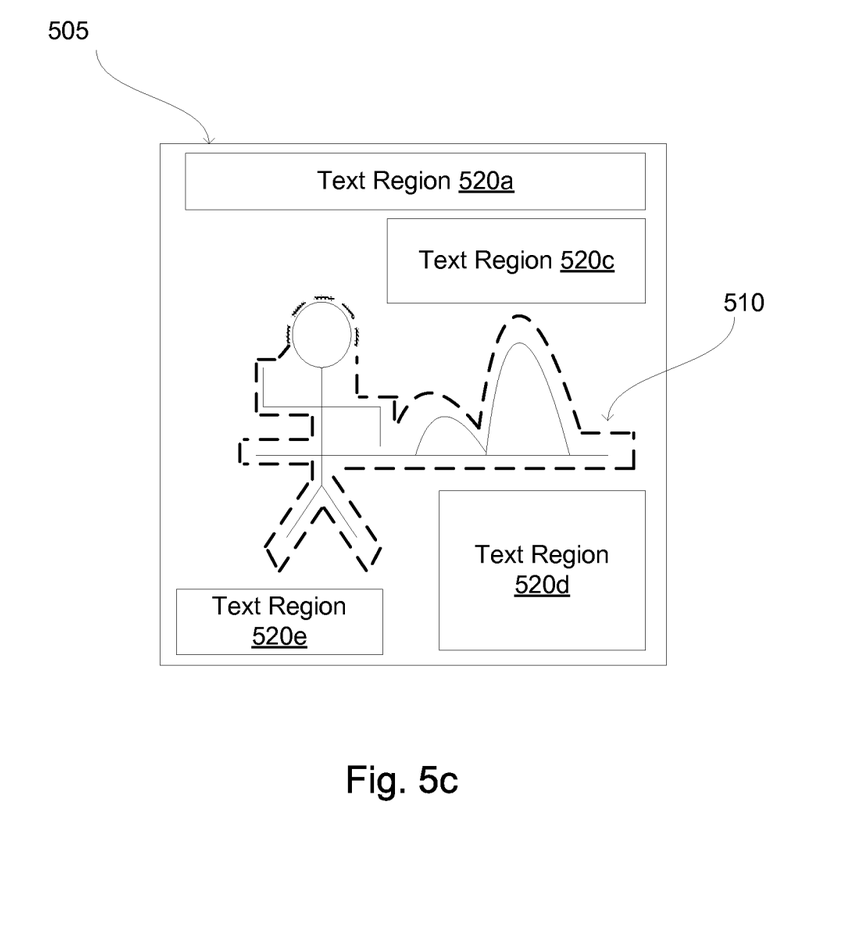

FIG. 5a-5c illustrate an example modifying an image to include text. In FIG. 5a, an image 505 includes a person 506 and background content 508. In FIG. 5b, regions capable of presenting text in the image 505 are identified. In the example of FIG. 5b, the person and the background content are identified as a feature 510 of the image, as described in conjunction with FIG. 4. However, in other embodiments, the person and the background content may be identified as separate features of the image. Based on the identified feature 510 and location information identifying the location of the feature 510 in the image 505, text regions 520a, 520b, 520c, 520d, 520e, and 520f (also referred to individually and collectively using reference number 520) are identified as regions capable of presenting text, as described above in conjunction with FIG. 4. In one example, the identified text regions 520 are at least a threshold distance away from the identified features 510 and are at least greater than a threshold size.

The digital magazine server 140 selects text to be presented with the image 505. For example, the text provides a user of the digital magazine server 140 with information associated with the image 505 or associated with content that is associated with the image 505. The selected text may contain different portions each associated with one or more display attributes and/or contextual attributes. In the example of FIGS. 5a-5c, a portion of the selected text is identified as a caption describing the image by an associated contextual attribute, an additional portion of the selected text is identified as a heading describing content associated with the image by an associated contextual attribute, and another portion of the selected text is identified as a summary of the content associated with the image by an associated contextual attribute.

FIG. 5c shows selection of regions capable of presenting text in the image 505 used to present text. In one embodiment, based on the identified text regions 520, the digital magazine server 140 identifies and retrieves an image template including at least a threshold number of regions for presenting text similar to the identified text regions 520, as described above in conjunction with FIG. 4. For example, the digital magazine server 140 retrieves a template containing regions for presenting text that are similar in size and location to text regions 520a, 520c, 520d, and 520e. The digital magazine 140 selects one or more regions for presenting text in the retrieved image template to present the selected text or portions of the selected text.

In one embodiment, based at least in part on the attributes associated with the portions of the selected text, the digital magazine server 140 selects one or more regions for presenting text in the image template similar to text regions 520a, 520c, 520d, and 520e, to display various portions of the selected text. The digital magazine server 140 identifies one or more text regions 520 for presenting the selected text based on the regions for presenting text in the image template associated with different portions of the selected text. For example, the digital magazine server 140 selects text region 520*a* to present the portion of the selected text identified as a heading, selects text region 520*c* to present the portion of the selected text identified as a caption, and selects text region 520*d* to present the portion of the selected text identified as a summary. The digital magazine server 140 identifies the location of the selected text regions 520*a*, 520*c*, and 520*d*, based at least in part on their associated location information, and modifies the image 505 to present the portions of the selected text associated with each of the selected text regions 520*a*, 520*c*, 520*d*. The modified image, which includes text overlaid on portions of the image in text regions 520*a*, 520*c*, and 520*d*, is presented to the user by the digital magazine server 140.

Summary

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method comprising:
    maintaining image templates in a template store, each image template including one or more regions for presenting text in one or more locations of the image template, each region having a size and a position relative to one or more regions;
    obtaining an image for presentation to a user of a digital magazine server;
    identifying one or more features of the image, the features identifying regions containing one or more objects included in the image;
    identifying one or more regions in the image capable of including text based at least in part on the one or more identified features, a region in the image capable of including text having at least a threshold distance from an identified feature and having at least a threshold size;
    selecting an image template including regions having at least a threshold number of attributes matching attributes of the identified one or more regions in the image;
    selecting text for presentation along with the image;
    selecting one or more regions of the selected image template having a maximum degree of similarity to one or more regions in the image capable of including text; and
    modifying the image to present the selected text in the one or more regions in the image capable of including text corresponding to the selected regions in the selected image template.

2. The method of claim 1, wherein identifying one or more features of the image further comprises:
    identifying edges associated with one or more of the objects included in the image; and
    identifying regions containing one or more objects included in the image, based at least in part on the identified edges associated with one or more of the objects included in the image.

3. The method of claim 1, wherein identifying one or more features of the image comprises:
    determining a location of a feature relative to one or more boundaries of the image;
    associating information describing the location with the feature; and
    storing the information describing the location of the feature in association with an identifier associated with the feature.

4. The method of claim 3, wherein the information describing the location of the feature includes one or more selected from a group consisting of: size information describing one or more dimensions of the feature, information describing a shape of the feature, information describing the location of the feature relative to one or more boundaries of the image, and any combination thereof.

5. The method of claim 1, wherein identifying one or more features of the image comprises:

generating a feature identifier associated with a feature, the feature identifier associating the feature with the image.

6. The method of claim 1, wherein identifying one or more regions in the image capable of including text based at least in part on the one or more identified features further comprises:
determining information describing one or more attributes of a region based at least in part on a location of a region relative to one or more boundaries of the image; and
storing the information describing one or more attributes of the region in association with an identifier corresponding to the region.

7. The method of claim 6, wherein the information describing the one or more attributes of the region include information selected from a group consisting of: the location of the region relative to one or more boundaries of the image, a description of a shape of the region, a description of one or more dimensions of the region, and any combination thereof.

8. The method of claim 6 wherein the identifier corresponding to the region associates the region with the image.

9. The method of claim 1, wherein selecting text for presentation along with the image further comprises:
identifying text associated with the image; and
retrieving the identified text for presentation along with the image.

10. The method of claim 1, wherein selecting one or more of the one or more regions in the image capable of including text comprises:
identifying text associated with the image;
identifying one or more portions of the identified text, each portion of the identified text associated with one or more attributes; and
selecting a region in the image capable of including text in which a portion of the identified text is presented based at least in part on one or more of the attributes associated with the portion of the identified text.

11. A method comprising:
maintaining image templates in a template store, each image template including one or more regions for presenting text in one or more locations of the image template, each region having a size and a position relative to one or more regions;
obtaining an image for presentation to a user of a digital magazine server;
identifying one or more features of the image, the features identifying regions containing one or more objects included in the image;
identifying one or more regions in the image capable of including text based at least in part on the one or more identified features, a region in the image capable of including text having at least a threshold distance from an identified feature and having at least a threshold size;
selecting an image template including regions having at least a threshold number of attributes matching attributes of the identified one or more regions in the image;
selecting text for presentation along with the image;
selecting one or more of the one or more regions in the image capable of including text and corresponding to regions in the selected image template;
modifying the image to present the selected text in the one or more selected regions in the image capable of including text; and
displaying the modified image to the user of the digital magazine sever.

12. The method of claim 11, wherein selecting one or more of the one or more regions in the image capable of including text further comprises:
identifying one or more portions of the selected text for presentation in a region in the image capable of including text based at least in part on characteristics of the region in the image capable of including text; and
associating the one or more portions of the selected text with the region in the image capable of including text.

13. The method of claim 11, wherein modifying the image to present the selected text in the one or more selected regions in the image capable of including text further comprises:
identifying one or more locations of the image corresponding to each of the one or more selected regions in the image; and
overlaying the selected text in the identified one or more locations of the image.

14. A computer program product comprising a non-transitory computer-readable medium having instructions encoded thereon that, when executed by a processor, cause the processor to:
maintain image templates in a template store, each image template including one or more regions for presenting text in one or more locations of the image template, each region having a size and a position relative to one or more regions;
obtain an image for presentation to a user of a digital magazine server;
identify one or more features of the image, the features identifying regions containing one or more objects included in the image;
identify one or more regions in the image capable of including text based at least in part on the one or more identified features, a region in the image capable of including text having at least a threshold distance from an identified feature and having at least a threshold size;
select an image template including regions having at least a threshold number of attributes matching attributes of the identified one or more regions in the image;
select text for presentation along with the image;
select one or more of the one or more regions in the image capable of including text;
modify the image to present the selected text in the one or more selected regions in the image capable of including text; and
display the modified image to the user of the digital magazine server.

15. The computer program product of claim 14, wherein select one or more of the one or more regions in the image capable of including text further comprises:
identify an image template including region for presenting text having at least a threshold similarity to at least a threshold number of the one or more identified regions capable of presenting text;
select one or more regions for presenting text in the identified image template for presenting text; and
identify regions in the image capable of including text based on locations associated with the selected one or more regions for presenting text in the identified image template.

16. The computer program product of claim 14, wherein select one or more of the one or more regions in the image capable of including text further comprises:

identify an image template including region for presenting text having at least a threshold similarity to at least a threshold number of the one or more identified regions capable of presenting text;

select one or more regions for presenting text in the identified image template for presenting text based at least in part on location information associated with the regions for presenting text in the identified image template identifying positions of the regions for presenting text relative to one or more boundaries of the identified image template; and identify regions in the image capable of including text based on locations associated with the selected one or more regions for presenting text in the identified image template.

17. The computer program product of claim 14, wherein select one or more of the one or more regions in the image capable of including text comprises:

identify text associated with the image;

identify one or more portion of the identified text, each portion of the identified text associated with one or more attributes; and select a region in the image capable of including text in which a portion of the identified text is presented based at least in part on one or more of the attributes associated with the portion of the identified text.

18. The computer program product of claim 14, wherein identify one or more regions in the image capable of including text based at least in part on the one or more identified features further comprises:

determine information describing one or more attributes of a region based at least in part on a location of a region relative to one or more boundaries of the image; and store the information describing one or more attributes of the region in association with an identifier corresponding to the region.

19. The computer program product of claim 18, wherein the information describing the one or more attributes of the region include information selected from a group consisting of: the location of the region relative to one or more boundaries of the image, a description of a shape of the region, a description of one or more dimensions of the region, and any combination thereof.

20. The computer program product of claim 14, wherein identify one or more regions in the image capable of including text based at least in part on the one or more identified features further comprises:

determine one or more colors associated with a region.

21. The computer program product of claim 14, wherein select text for presentation along with the image further comprises:

identify text associated with the image;

determine one or more colors associated with one or more portions of the identified text; and retrieving one or more portions of the identified text for presentation along with the image based at least in part on the one or more colors associated with the one or more portions of the identified text.

22. The computer program product of claim 14, wherein modify the image to present the selected text in the one or more selected regions in the image capable of including text further comprises:

modifying the selected text based on one or more colors associated with the one or more selected regions.

23. The computer program product of claim 22, wherein modifying the selected text further comprises: presenting an outline around one or more borders of the selected text, modifying a color of the selected text, modifying a font of the selected text, and any combination thereof.

\* \* \* \* \*